United States Patent
deDoes (12)

(10) Patent No.: US 6,457,896 B1
(45) Date of Patent: Oct. 1, 2002

(54) BREAKAWAY COUPLING

(76) Inventor: Eric deDoes, 3628 Turner Ridge Rd., Somerville, ME (US) 04348

(*) Notice: Subject to any disclaimer, the term of this patent is extended or adjusted under 35 U.S.C. 154(b) by 0 days.

(21) Appl. No.: 09/715,274

(22) Filed: Nov. 17, 2000

(51) Int. Cl.[7] .................................................. F16D 9/00
(52) U.S. Cl. .................. 403/2; 403/2; 403/78; 403/79; 403/164; 285/2; 285/3; 285/4
(58) Field of Search ................... 403/2, 79, 78, 403/164; 285/2, 4, 3; 59/89

(56) References Cited

U.S. PATENT DOCUMENTS

| | | | |
|---|---|---|---|
| 2,665,128 A | * 1/1954 | Guffey | |
| 2,768,468 A | * 10/1956 | Kibler et al. | 43/43.12 |
| 2,839,803 A | 6/1958 | Wiselka | 24/73 |
| 3,488,877 A | 1/1970 | Carabasse | 43/42.09 |
| 3,541,720 A | 11/1970 | Buffet | 43/42.19 |
| 3,925,921 A | 12/1975 | Tucker et al. | 43/43.12 |
| 4,125,958 A | 11/1978 | Cote | 43/43.12 |
| 4,517,913 A | * 5/1985 | Albertini et al. | |
| 4,687,365 A | * 8/1987 | Promersberger | 403/164 X |
| 4,733,625 A | * 3/1988 | Allen | |
| 4,864,696 A | * 9/1989 | Mittermaier et al. | 403/2 |
| 5,122,007 A | * 6/1992 | Smith | 403/2 |
| 5,244,135 A | 9/1993 | Nelson | 224/202 |
| 5,461,821 A | 10/1995 | Carter, Jr. | 43/43.12 |
| 5,913,670 A | 6/1999 | Anderson et al. | 43/4.5 |
| 6,286,190 B1 | * 9/2001 | Friend et al. | |

OTHER PUBLICATIONS

Hamilton Marine product catalog, 2000, p. 186.

* cited by examiner

Primary Examiner—Lynne H. Browne
Assistant Examiner—Victor MacArthur
(74) Attorney, Agent, or Firm—Pierce Atwood

(57) ABSTRACT

A breakaway coupling having a loop for receiving a connecting element. The loop includes a material reduction region. The material reduction region is formed as part of the loop such that the loop breaks at that region when placed under a pre-defined load. The coupling may be of fixed or swivel configuration. The material reduction region has dimensions less than the remainder of the loop such that-when the selected load is reached, the loop will break in that region. This design is particularly suited for those conditions when an underwater connecting element, such as a rope tied between an underwater lobster trap and a floating buoy, comes in contact with a marine animal. If the animal is of sufficient size, such as a whale, to apply the selected load to loop breakage, the connecting element will be released and the possibility of entanglement with the marine animal will be substantially reduced.

4 Claims, 1 Drawing Sheet

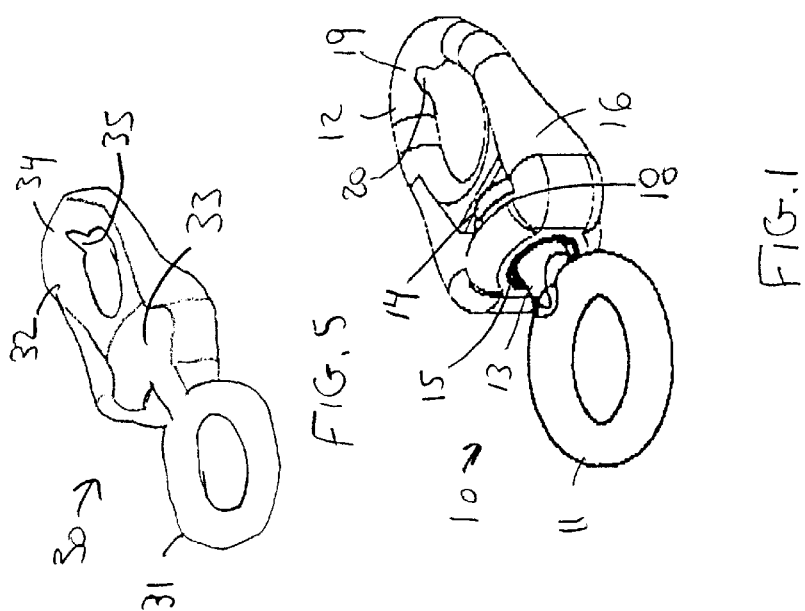
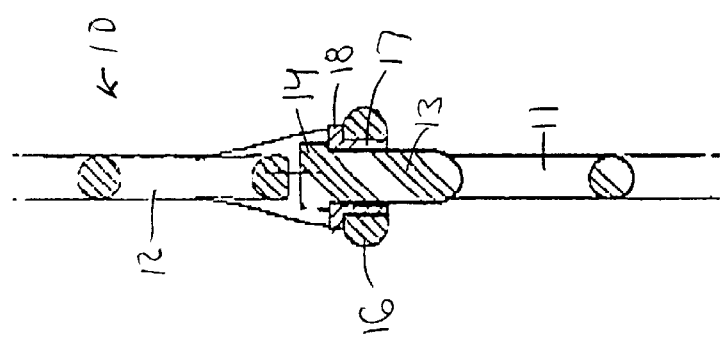
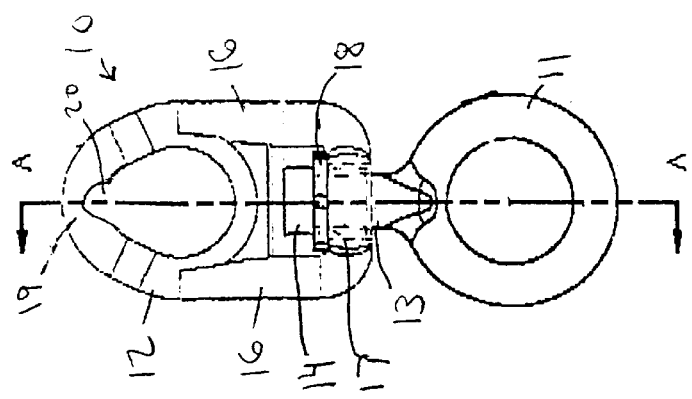

BREAKAWAY COUPLING

BACKGROUND OF THE INVENTION

1. Field of the Invention

The present invention relates to couplings. More particularly, the present invention relates to couplings for marine applications, including devices to link ropes, netting, and the like to floating markers. Still more particularly, the present invention relates to swivel and fixed couplings.

2. Description of the Prior Art

Buoys are used as floating markers to notify fishermen, casual boaters, commercial shippers, marine researchers, etc. of the position of a linkage device in water. The linkage device connects the buoy (a location marker, weather buoy, navigational buoy, etc.) to something that is below the water surface such as, for example, a fishing gillnet, a chain, or a rope that has a distal end connected to some other structure. That other structure may be any one of a wide array of structures located underwater that is of interest to be observed or retrieved. One example of such another structure is a lobster trap. Other such structures include the anchors or weights used to keep weather buoys and navigational buoys in a range of positions.

It is a fairly common practice in fixed-fishing gear fields, such as the lobstering business, for example, to connect a plurality of structures, e.g., lobster traps, to a single marker buoy. That connection may be made by way of a set of ropes in series, with the last one being coupled directly to the buoy. Alternatively, two buoys may be spaced apart from one another, with a series of underwater structures connected together by rope, the first tied to one of the two buoys and the last in the series tied to the other buoy. The linkage or connecting device may be a unitary structure with an eyelet or opening through which the rope (or chain, etc.) passes and to which the rope may be tied. Alternatively, the rope or chain may be wrapped around the linkage device and coupled to a floating structure. In either case, it is of great desire to ensure that the rope or chain remains firmly connected to the floating device. For a lobster trap, it is of interest to keep a rope connected to its corresponding marker buoy so that the trap may be retrieved from the seabed by pulling on the rope. If the rope is not securely fastened to the buoy, the trap and its contents may be irretrievably lost.

Presently, lobster buoys are coupled to the ropes of one or more traps using marker buoys. The buoy may simply be a float or a float in combination with a stick having identifying markings, such as painted designs, flags, or the like, extending from the water surface. The marker stick may be fabricated of wood, plastic or metal, although plastic is increasingly preferred. The opposing end of the stick includes an eyelet to which the rope is tied. As noted, it is of great desire to ensure that the rope keeps the buoy and the underwater structure coupled together. For that reason, rope of very high test strength is employed.

Unfortunately, the commercial interest in keeping underlying equipment coupled to their associated surface markers can run counter to environmental interest. In particular, it is known that whales, such as the endangered right whale, come in contact with man-made components of the type described, occasionally with undesired outcomes. Under the 1995 Marine Mammal Protection Act, legislation was enacted to mandate that there would be no right whale deaths occurring from interaction with commercial fishing equipment. Contemplated steps for achieving that goal have included the closure of important fishing areas for extended periods of time as well as unspecified significant modifications to fishing equipment. Either option would adversely impact the commercial fishing industry, without certainty of solution to the problem. That is, the mechanism of whale entanglement with fishing equipment is unclear and therefore the existing proposed solutions may not achieve the desired goal.

It is believed that the whales may become entangled in buoy lines and nets and lines within the ocean by the following process. First, when they encounter such underwater obstacles, they may move in the direction of the obstacle, such as upward along a lobster trap rope. The force of the whale's efforts pulls the buoy underwater until such time as it is captured in the whale's baleen, against a flipper, or against some other body part. As the whale moves, pulling the entire connected underwater structure with it, it likely thrashes about, becoming further entangled. This entanglement may trap the whale underwater where it drowns.

Therefore, what is needed is a connection device that may be used to couple together one or more underwater structures and their associated connectors with one or more floating markers. Also, what is needed is such a connection device having sufficient strength to complete the connection noted and to maintain that connection under expected use conditions. Further, what is needed is such a connection device that is designed to prevent entanglement of the structure, the marker, and the connector with marine animals such as whales.

SUMMARY OF THE INVENTION

In view of the foregoing, it is an object of the present invention to provide a connection device that may be used to couple together one or more underwater structures and their associated connectors with one or more floating markers. It is also an object of the present invention to provide such a connection device having sufficient strength to complete the connection noted and to maintain that connection under expected use conditions. It is another object of the present invention to provide such a connection device that is designed to prevent entanglement of the structure, the marker, and the connector with marine animals such as whales.

These and other objects are achieved with the present invention, which is a notched coupling wherein the coupling includes a notch or a reduced thickness region. The coupling may be of fixed or swivel configuration. The reduced thickness region is designed to be the primary region in contact with the connector, such as a rope. That region is designed to fail catastrophically under a selectable stress preferably greater than the stress ordinarily experienced by the coupling. For example, if the marker is a buoy, the underwater structure is a lobster trap, and the connector is a nylon rope, the notched coupling is designed with sufficient retaining strength to remain intact when the trap is deployed and when it is hauled into a boat. However, when the rope contacts a mobile underwater body, such as a whale, the strain associated with the movement of that body reaches a level that exceeds the breakpoint of the coupling at the notch. At that time, the coupling breaks at the notch and the buoy is released from the rope and the lobster trap. The coupling may be fabricated of any suitable material including, but not limited to, a plastic such as nylon.

These and other advantages of the present invention will be understood upon review of the drawings, the detailed description, and the appended claims.

BRIEF DESCRIPTION OF THE DRAWINGS

FIG. 1 is a perspective view of the swivel version of the notched coupling of the present invention.

FIG. 2 is a plan view of the swivel version of the notched coupling of the present invention.

FIG. 3 is an end view of the swivel version of the notched coupling of the present invention.

FIG. 4 is a view through section A—A of FIG. 2.

FIG. 5 is a perspective view of the fixed version of the notched coupling of the present invention.

DETAILED DESCRIPTION OF PREFERRED EMBODIMENTS

A breakaway swivel coupling 10 of the present invention is illustrated in FIGS. 1–4. The coupling 10 includes a first connecting loop 11 for receiving a connecting element, such as a rope that may be tied to a marker capable of floating on the surface of water. The coupling 10 also includes a second loop 12 for receiving a connecting element, such as a rope that may be tied to an underwater structure including, but not limited to, a ballast weight, a gillnet, or a lobster trap. The coupling 10 is designed to connect together the floating marker and the underwater structure. Although it may be made of a variety of materials, the coupling 10 is preferably made of plastic in order to survive the environmental conditions it faces. More particularly, the coupling 10 is preferably fabricated of nylon material.

The particular coupling 10 shown in FIGS. 1–4 is of the swivel type. As a result, the first loop 11 includes a neck 13 terminating in a button flange 14. The first loop 11, neck 13, and flange 14 are preferably fabricated as a unitary piece but that is not specifically required. The flange 14 is sized to pass through a port 15 of body 16 associated with the second loop 12 of the coupling 10. A split bushing 17 having a bushing flange 18 with dimensions greater than the inner dimensions of the port 15 capture the neck 13 of the first loop 11 to the body 16 of the second loop 12. The fit between the neck 13 and the bushing 17 is not tight, however, such that the neck 13 and thus the loop 11 can rotate or swivel completely about. This may be of interest when either of the two loops 11, 12 is to remain substantially stationary while the other spins about to prevent twisting of the connector. The second loop 12 and its body 16 including port 15 are preferably fabricated as a unitary piece but that is not specifically required. The body and the flange 18 of the bushing 17 are also preferably formed as a unitary piece.

The coupling 10 provides a breakaway mechanism that causes a rope or other connector affixed to the second loop 12 to be separated from that loop under selectable load conditions. Specifically, the second loop 12 of the coupling 10 includes a material reduction region 19 in the body wall thereof. That material reduction region 19 may be established by reducing the cross-sectional dimension of that portion of the body of the second loop 12, either by machining, grinding or otherwise mechanically taking away loop material in that region, such as by making a notch 20 of selectable dimensions. Alternatively, for a plastic second loop 12, the material reduction region 19 may be established during the molding of that part of the coupling 10.

It is to be understood that the physical properties of the coupling 10 may be selected based upon the expected conditions for its usage. That is, for example, it may be used in association with one or more lobster traps where environmental conditions, such as tide change strength, may be relatively mild. Alternatively, it may be used in a location where tide changes produce severe drag conditions. In either case, the coupling 10 is formed of material suitable to prevent the floatable marker from disconnecting from the underwater structure during expected conditions, including an intended bringing to the surface of the underwater structure. However, the coupling 10 is designed with the material reduction region 19 such that when an unexpected event occurs, such as the entanglement of a whale with a connecting rope, the force of that higher-than-expected load causes catastrophic failure of the second loop 12 at region 19. An approximation of that failure point can be designed into the second loop 12 as a function of the thickness of the region 19. For example, it may have a cross-sectional area approximately two-thirds that of the remainder of the second loop 12 so that it the second loop 12 breaks at a load two-thirds of what would be the break point of the second loop 12 without the reduction region 19.

An alternative embodiment of the present invention is a fixed coupling 30 shown in FIG. 5. Coupling 30 includes a first loop 31 and a second loop 32 designed much the same as first and second loops 11,12 of swivel coupling 10. However, unlike that first coupling, the loops 31,32 are fixedly coupled together so that one cannot rotate or swivel with respect to the other. Preferably, the first loop 31 is integrally molded to second loop 32 by way of coupling body 33 in a manner well known to those who fabricate unitary parts such as plastic products. The fixed coupling 30 includes as part of the second loop 32 a material reduction region 34 that may be established by way of a notch 35 in the material that forms that portion of the coupling 30. That aspect of the coupling 30 is substantially the same as the corresponding portion of coupling 10 described with respect to FIGS. 1–4.

In summary, the present invention is a coupling device having a material reduction region that causes the coupling to break in that particular area where a connector element is coupled. In that way, the coupling can be engineered to fail at a specific location under a selectable load or range of loads. In the field of underwater structures that may be contacted by marine animals, that selectable load may be determined so as to prevent entanglement of marine animals with the connector element.

While the invention has been described with reference to particular example embodiments, it is intended to cover all modifications and equivalents as described in the following claims.

What is claimed is:

1. A breakaway coupling comprising:

a first body member having a first loop for connecting a first connector element to said coupling, said first body member including a neck terminating in a button flange;

a second body member having a second loop for connecting a second connector element to said coupling, said second body member including a port for receiving said neck so as to be rotatably joined to said first body member and having a material reduction region formed in said second loop such that said second loop will fail at said material reduction region when said coupling is under stress of a predetermined magnitude, wherein said material reduction region is located such that a connector element connected to said second loop will be completely released from said second loop when said second loop fails; and a bushing disposed in said port for capturing said neck within said pot.

2. The breakaway coupling of claim 1 wherein said first body member, said second body member and said bushing are all fabricated of a plastic material.

3. The breakaway coupling of claim 2 wherein said plastic material is nylon.

4. The breakaway coupling of claim 1 wherein said material reduction region is established by forming a notch in said second loop.

* * * * *